United States Patent [19]

Depperman

[11] Patent Number: 4,580,932

[45] Date of Patent: Apr. 8, 1986

[54] DEBURRING TOOL

[75] Inventor: Warren B. Depperman, Camden, S.C.

[73] Assignee: Cogsdill Tool Products, Camden, S.C.

[21] Appl. No.: 581,549

[22] Filed: Feb. 21, 1984

[51] Int. Cl.[4] .................. B23B 41/00; B23B 51/10
[52] U.S. Cl. ................................. 408/81; 407/9;
    408/111; 408/143; 408/201; 408/714
[58] Field of Search ................... 407/9; 408/110–112,
    408/196, 197, 227, 231, 714, 224, 143, 201,
    79–81

[56] References Cited

U.S. PATENT DOCUMENTS

| 2,187,221 | 1/1940 | Brown | 144/251 R X |
| 2,703,996 | 3/1955 | Reynolds et al. | 408/714 X |
| 2,804,789 | 9/1957 | Randles et al. | 408/714 X |
| 2,868,045 | 1/1959 | Fried | 407/9 |

Primary Examiner—Gil Weidenfeld
Assistant Examiner—Steven C. Bishop
Attorney, Agent, or Firm—Harness, Dickey & Pierce

[57] ABSTRACT

A deburring tool for deburring the irregular or out-of-round edge of holes drilled in a workpiece having a shank with a self-piloting head and a blade associated with that head, a mechanism for permitting the blade to move axially within limits of movement relative to the shank and a drive element and a mechanism for biasing the blade toward a workpiece. Further, a mechanism is provided for adjusting the bias of the biasing mechanism to vary the bias in accordance with the characteristics of the material to be deburred.

5 Claims, 5 Drawing Figures

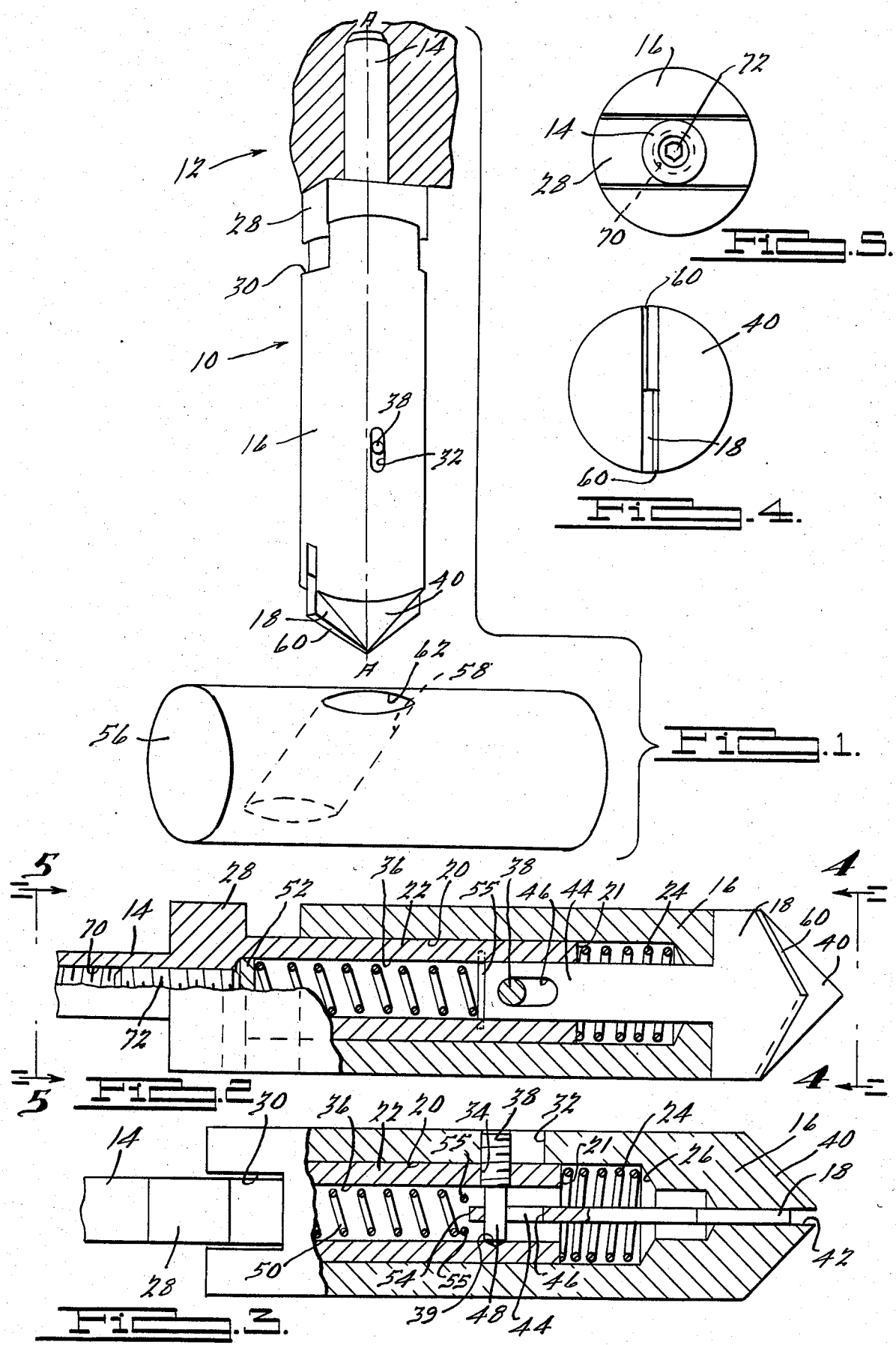

DEBURRING TOOL

BACKGROUND AND SUMMARY OF THE INVENTION

This invention relates to deburring tools, and is particularly concerned with the construction of a deburring tool which is capable of deburring or chamfering the edge of elliptical or out-of-round holes.

It is desirable in the manufacturing industry to have smooth surfaces even after holes are drilled into those surfaces to properly fit parts into the holes or other considerations. The surfaces are generally made smooth by deburring tools. As drilling techniques improved in the machine tool industry, holes were angulated and presented an elliptical or otherwise out-of-round edge profile at the surface. Typically, such out-of-round edge profiles are created by drilling holes through curved or cylindrical surfaces or drilling holes into flat or curved surfaces at an angle not perpendicular to the surface of the workpiece.

The present invention is designed specifically for deburring the surface of these curved, elliptical, or otherwise out-of-round hole edge profiles. The present invention is simple to operate and makes the tool easy to use by unskilled operators. It is only necessary to place the conical tip of the tool in the hole to be deburred and to rotate the tool in a spindle perpendicular to the work surface. When force is applied, the shank of the tool moves towards the workpiece exposing a spring loaded blade that swiftly and smoothly removes the burrs from the outer edge of the hole.

The present invention also has the advantage of being used with any rotating spindle, such as low speed portable hand drills, drill presses, or automatic equipment. Only light contact pressure is necessary to produce the desired cutting action.

The present invention further provides the advantage of adjustment to adapt the tool for use with a wide range of materials. By merely turning a screw, the spring tension on the cutting blade may be either increased or decreased. A light spring tension is used with softer materials while increased tensions are more appropriate for use with harder materials.

Chamfer depth is controlled by the amount of time between the application by the operator of the cutting edge of the blade into engagement with the hole edge and the release of the tool blade from the edge, normally called the dwell time of the tool. Typically the optimal dwell time will be determined after suitable testing operations. Generally the chamfer depth is directly proportional to dwell time up to the point of the operation where the tool will effectively cease to cut.

Further advantages of the present invention are that it is self-piloting and allows the lateral operating range of each tool to vary from the blade tip thickness to the maximum blade width.

A further advantage is that blade replacement in the present invention is extremely simple and involves only the removal of a set screw from the side of the tool. Further, blade life is extended with the present invention in that the blade never encounters the full brunt of the contact force in positioning the tool on the workpiece, but instead encounters only cutting forces, with the shank portion absorbing contact forces.

Further objects, advantages, and features of the invention will become apparent from the following description taken in conjunction with the accompanying drawings.

BRIEF DESCRIPTION OF THE DRAWINGS

FIG. 1 is a schematic elevational side view of the tool of the present invention;

FIG. 2 is a side sectional view of the deburring tool of FIG. 1;

FIG. 3 is a side sectional view of the deburring tool of FIG. 2 rotated 90 degrees;

FIG. 4 is an elevated front view illustrating the cutting portion of the tool of FIG. 2; and FIG. 5 is an elevated rear view of the tool of the present invention disassembled from its tool holder.

DESCRIPTION OF THE PREFERRED EMBODIMENT

Referring to FIG. 1, an elliptical deburring tool 10 is illustrated engaged in a suitable tool holder, portable hand drill, or the like 12 at the drive lug 14 thereof. The tool holder 12 rotates the tool 10 about an axis A—A of FIG. 1.

The tool 10 itself comprises a drive lug 14 interconnected with a drive shank 16 through which a blade 18 is operably associated to move in and out of the drive shank 16. The drive shank 16 has an interior cylindrical bore 20 which slideably conforms to the dimension of a cylindrical portion 22 of the drive lug 14. At one end of the bore 20, a spring 24 is disposed between an end abutment portion 26 of the bore 20 and the end 21 of the cylindrical portion 22 of the drive lug 14. The spring 24 biases the shank 16 and the drive lug 14 away from one another. The drive lug 14 includes a laterally disposed portion 28 which moves within a laterally disposed slot 30 in the drive shaft 16.

The drive shank 16 also includes a laterally disposed slot 32 at an intermediate axial portion thereof. The cylindrical portion 20 of the drive lug 14 includes a laterally disposed threaded bore 34 and an interior axially disposed bore 36. A set screw 38 is disposed through the slot 32 into the threaded bore 34 and extends through that bore 34 and through the interior axially disposed bore 36 of the cylindrical portion 20 of the drive lug 14 into engagement with a notch 39 in the bore 36. The set screw 38 has a primary function of holding the tool together and acting against the walls of the slot 32 to positively stop the relative axial movement between the drive shank 16 and the drive lug 14. All rotative movements of the tool, however, are primarily interfaced by the laterally disposed portions 28 of the drive lug 14 acting against the sidewalls of the slot 32.

The shank 16 has a conical head portion 40 at its leading edge within which head portion 40 is disposed a laterally disposed slot 42. The blade 18 is disposed in the slot 42 and has an extended body portion 44 which extends into both the cylindrical chamber 20 of the shank 16 and the cylindrical bore 36 of the drive lug 14. This extended portion 44 of the blade 18 also includes a slot 46 through which an extended portion 48 of the set screw 38 is disposed to hold the blade in place relative to the tool 10 and also permit movement of the blade along the axis A—A of the tool. The ends of the slot 44 act against the extended portion 48 of the set screw 38 to provide a positive stop in both directions for the blade 18. A blade tension spring 50 is disposed within the bore 36 of the drive lug 14 abutting at one end against a disc 52 disposed at one end 53 of the bore 36 and abutting against the interior end 54 of the blade 18 at the other end of the spring 50. The spring 50 is held in place by a pair of pins 55 across the bore 36 between which pins 55 the extended body portion 44 of the blade moves axially.

Thus in operation, as illustrated in FIG. 1, subsequent to the drilling or boring of a angulated hole or similar hole which creates an elliptical or out-of-round hole at the surface of the workpiece 56, the tool is directed towards the workpiece 56 at a right angle to the surface. The conical head 40 of the tool 10 will contact the workpiece around the hole 58 and self pilot the tool 10 into the hole 58. The tool 10 will be rotating along its axis A—A throughout this process. Once the tool is engaged in the hole 58, the blade 18 will protrude from the shank 16 in such a manner that its cutting edges 60 will interface with the out-of-round edge 62 of the hole and debur that hole. Once the operation is completed to the operator's satisfaction or desired specifications, the tool 10 is withdrawn.

Thus, the conical head 40 of the tool shank 16 will normally incur all of the out of the ordinary contact pressures of the deburring operation that may otherwise damage the blade. Any excessive axial movement will also force the tool shank 16 at the slot 30 thereof against the drive lug 14 at the laterally disposed portions 28 thereof. The blade 18 will only incur cutting forces at its edges 60. As the tool rotates, the blade will change position with respect to the shank to debur the hole at varied elevations of the blade relative to the edge of the hole. The final product will be a deburred elliptical hole.

The drive lug 28 also includes a smaller axial bore 70 extended from axial bore 36, at least a portion of which bore 70 is threaded. An Allen head screw 72 is threadably disposed in the bore 70 and abuts the disc 52 disposed at the end 53 of the blade tension spring 50. The tension of the spring 50 can thus be adjusted by movement of the screw 72 in the desired direction depending upon the characteristics of the material being deburred.

Thus, there is disclosed in the above description and the drawings an improved elliptical deburring tool which fully and effectively accomplishes in the objectives thereof. The dimensions and operating times set forth in the above specification are merely representative and are not meant to be limiting on the scope of the invention. It would be apparent that variations and modifications of the disclosed embodiments may be made without departing from the principles of the invention or the scope of the appended claims.

I claim:

1. A deburring tool adapted to be driven by a rotating tool holder particularly useful for deburring edges of holes having irregular shapes and holes formed by curved surfaces comprising:
    a drive lug mountable to said tool holder;
    a shank having a first end and a second end and an internal bore, said first end forming a conical tip with a lateral slot through said tip, said second end slidably receiving said drive lug, said shank further including an elongated slot;
    first biasing means acting on said drive lug and said shank urging said shank in a direction away from said tool holder;
    means for preventing relative rotation between said drive lug and said shank and restricting relative axial movement in at least one direction between said drive lug and said shank to a limited range;
    a blade having a pointed end, a pair of edges emanating from said pointed end, and a width substantially greater than its thickness, said blade disposed within said shank lateral slot, said edges intersecting the outer surface of said conical tip in substantially all dispositions of said blade in said slot, said blade further including an elongated slot;
    second biasing means acting on said drive lug and said blade urging said blade in a direction away from said tool holder; and
    means for restricting relative axial movement between said blade and said drive lug comprising a set screw threadably engaging said drive lug and having protruding portions which fit within said elongated slots included in said shank and said blade.

2. A deburring tool in accordance with claim 1, further comprising means for adjusting the bias of said second biasing means.

3. A deburring tool in accordance with claim 1, wherein said blade has a V-shaped cross-section.

4. The deburring tool according to claim 1, wherein said first and second biasing means comprise helical springs.

5. The deburring tool according to claim 4, further comprising
    said drive lug forming an internal threaded bore; and
    a threaded adjustment plug disposed within said drive lug bore and abutting said second biasing means whereby rotation of said plug causes variations in the urging force acting on said blade exerted by said second biasing means.

* * * * *